June 3, 1930.  C. J. AKALIS  1,761,382
ROTARY TABLE SILVERWARE SERVER
Filed March 7, 1929
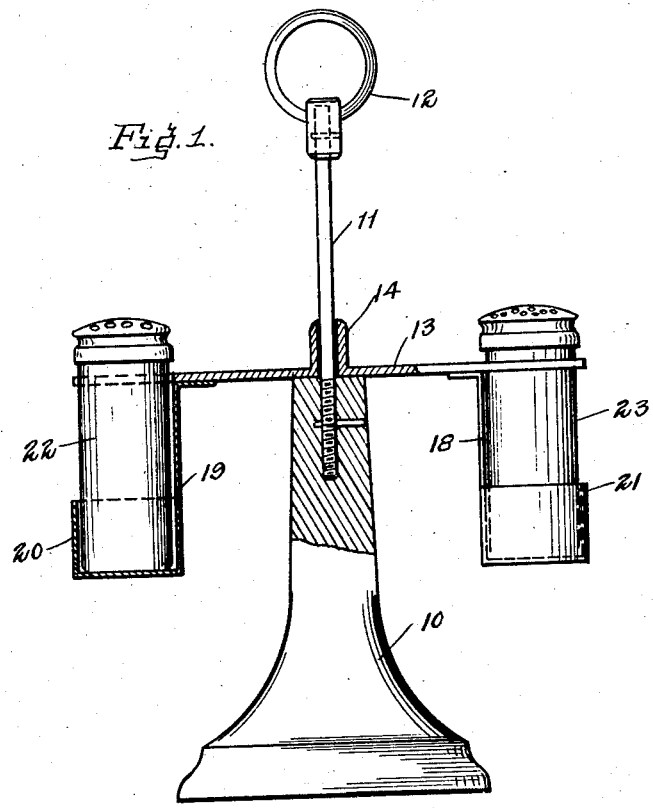
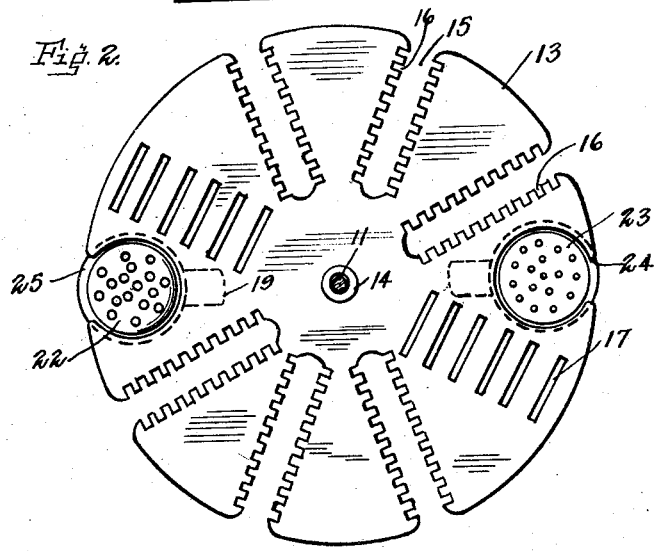
Inventor
Charles John Akalis Patented June 3, 1930

1,761,382

UNITED STATES PATENT OFFICE

CHARLES JOHN AKALIS, OF SUGAR NOTCH, PENNSYLVANIA

ROTARY TABLE-SILVERWARE SERVER

Application filed March 7, 1929. Serial No. 344,976.

This invention relates to a novel and improved combination condiment holder and support for tableware such as knives, forks, spoons, and the like, and it is the principal object of my invention to provide a device of this character allowing the user to select, and readily remove from the device the articles he desires to use.

Another object of my invention is the provision of a device of the above described character which is comparatively simple and inexpensive to construct, yet durable and efficient in its operation.

A further object of my invention is the provision of a device of this type holding the tableware in an orderly manner within convenient reach of the user which is especially desirable if the device is to be used in public eating places or restaurants, as the user may rotate the holder plate until the desired article is in front.

A still further object of my invention is the provision of a device allowing a convenient removal of the condiment holders such as salt and pepper shakers, for use or cleaning and refilling.

These and other objects and advantages of my invention will become more fully apparent as the description thereof proceeds, and will then be specifically defined in the appended claim.

In the accompanying drawing, forming a material part of this disclosure:

Fig. 1 is a sectional front elevation of a combination condiment holder and knife, fork, and spoon support constructed according to my invention.

Fig. 2 is a top plan view thereof after the removal of the handle.

As shown on the drawing, the device constructed according to the present invention comprises a base or stand 10 having a vertical threaded bore in its top adapted to receive the lower, threaded end of a handle 11, the upper end of which is equipped with a suitably connected ring 12.

A plate 13 has a centrally located upright socket 14 formed therewith supported by the upper end of the base and rotatably held thereon by the handle 11.

The outer periphery of the substantially circular plate 13 is radially slotted at a plurality of points, and each of said slots 15 has on opposite sides thereof opposed pairs of notches 16 serving to accommodate and support the shanks of forks or spoons or the like adapted to be arranged one behind the other in a row.

The plate 13 is also provided with radially extending rows of elongated slots or openings 17 adapted to receive and removably hold the blades of knives or the like, and while the drawing shows two of such radial rows of slots only, it will be evident that any number of them may be provided at suitable places.

Brackets 18 having their upper horizontal arms attached to the underside of plate 13 carry at the lower ends of their depending, vertical arms holder sockets 20, 21 for the support of condiment holders, as for instance a salt shaker 22 and pepper shaker 23.

The periphery of plate 13 is open, as at 24 and 25 to facilitate the removal of the salt and pepper shaker from plate 13.

The operation of my device will be entirely clear from the above description and simultaneous inspection of the drawing, and it will be evident that a convenient number of knives, forks, and spoons may be supported in the slots of plate 13 always ready for instantaneous use, while a rotation of the plate 13 about its handle will bring the desired article as well as the pepper and salt shaker into convenient reach.

It is to be understood that I have described and shown the preferred form of my invention as one example only of the many possible ways to practically construct the device, and that I may make such changes therein as come within the scope of the appended claim without departure from my invention.

Having thus described my device, what I claim as new, and desire to secure by Letters Patent is:

A combination condiment holder and table-ware support comprising a base, a plate rotatably held thereon, said plate provided with a plurality of radial slots having each of their opposite walls notched pairwise for the reception and suspension of forks and spoons, said plate having also a plurality of radially arranged rows of a multitude of elongated slots for the reception and support of knives, and two open slots for removably guiding a salt and pepper shaker, a pair of brackets suspended from said plate and sockets at the lower ends of said brackets for supporting said salt and pepper shakers.

Signed at Sugar Notch, in the county of Luzerne, and State of Pennsylvania, this 26 day of February, A. D. 1929.

CHARLES JOHN AKALIS.